United States Patent
Carls et al.

(10) Patent No.: US 10,477,194 B2
(45) Date of Patent: Nov. 12, 2019

(54) TWO IMAGER PROJECTION DEVICE

(71) Applicant: 3M INNOVATIVE PROPERTIES COMPANY, St. Paul, MN (US)

(72) Inventors: Joseph C. Carls, Austin, TX (US); Craig R. Schardt, Woodbury, MN (US); Duane E. Preiss, Austin, TX (US); Dwight E. Baldwin, Austin, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 19 days.

(21) Appl. No.: 14/395,930

(22) PCT Filed: Apr. 16, 2013

(86) PCT No.: PCT/US2013/036679
§ 371 (c)(1),
(2) Date: Oct. 21, 2014

(87) PCT Pub. No.: WO2013/162939
PCT Pub. Date: Oct. 31, 2013

(65) Prior Publication Data
US 2015/0103151 A1    Apr. 16, 2015

Related U.S. Application Data

(60) Provisional application No. 61/637,933, filed on Apr. 25, 2012.

(51) Int. Cl.
*H04N 13/04*    (2006.01)
*H04N 13/337*   (2018.01)
(Continued)

(52) U.S. Cl.
CPC ......... *H04N 13/337* (2018.05); *G02B 27/283* (2013.01); *H04N 13/363* (2018.05)

(58) Field of Classification Search
CPC ............. H04N 13/0434; H04N 13/337; H04N 13/363; H04N 13/0459; G02B 27/149;
(Continued)

(56) References Cited

U.S. PATENT DOCUMENTS 5,245,472 A * 9/1993 Hegg .................. G02B 27/283
                                                       359/488.01
5,921,650 A    7/1999 Doany
(Continued)

FOREIGN PATENT DOCUMENTS

CN    201837829    5/2011
EP       428971    5/1991
(Continued)

OTHER PUBLICATIONS

International Search Report for PCT Application No. PCT/US2013/036679 dated Oct. 25, 2013, 4 pages.

*Primary Examiner* — Cara E Rakowski
*Assistant Examiner* — Christopher A Lamb, II
(74) *Attorney, Agent, or Firm* — Jonathan L. Tolstedt (57) ABSTRACT

The present disclosure describes optical elements and optical devices that use the optical elements to allow the output of two imagers to be combined onto a single optical axis. Each of the two imagers can be based on alternate polarization directions, and the disclosed embodiments can enable high contrast 3D projectors without requiring either time or polarization sequencing. The present disclosure further describes projection systems that include the optical devices.

11 Claims, 4 Drawing Sheets

(51) Int. Cl.
*H04N 13/363* (2018.01)
*G02B 27/28* (2006.01)

(58) Field of Classification Search
CPC .... G02B 5/305; G02B 5/3025; G02B 5/3041; G02B 27/26; G02B 27/28; G02B 27/283; G02B 27/286; G02B 27/2228; G03B 35/26
See application file for complete search history.

(56) References Cited

U.S. PATENT DOCUMENTS

| | | | |
|---|---|---|---|
| 5,962,114 A | 10/1999 | Jonza | |
| 6,328,447 B1 | 12/2001 | Yamazaki | |
| 6,490,087 B1* | 12/2002 | Fulkerson | G02B 27/283 |
| | | | 348/E5.141 |
| 6,721,096 B2 | 4/2004 | Bruzzone | |
| 7,403,320 B2 | 7/2008 | Bausenwein | |
| 7,466,473 B2 | 12/2008 | Bausenwein | |
| 7,817,329 B2 | 10/2010 | Bausenwein | |
| 7,821,713 B2 | 10/2010 | Magarill | |
| 7,926,949 B1 | 4/2011 | Boothroyd | |
| 7,929,208 B2 | 4/2011 | Mayer | |
| 8,085,462 B2 | 12/2011 | Mayer | |
| 8,102,589 B2 | 1/2012 | Bausenwein | |
| 8,388,138 B1* | 3/2013 | Boothroyd | G02B 27/26 |
| | | | 348/51 |
| 8,804,229 B2 | 8/2014 | Bausenwein | |
| 2003/0081179 A1 | 5/2003 | Pentico | |
| 2004/0169823 A1 | 9/2004 | Bridgwater | |
| 2005/0237487 A1 | 10/2005 | Chang | |
| 2006/0228092 A1* | 10/2006 | Hebrink | B32B 3/26 |
| | | | 385/147 |
| 2007/0002279 A1 | 1/2007 | Berman | |
| 2007/0159693 A1* | 7/2007 | Mayer | H04N 9/3105 |
| | | | 359/485.02 |
| 2009/0051878 A1 | 2/2009 | Hsu | |
| 2009/0073389 A1 | 3/2009 | Dobler | |
| 2009/0091814 A1 | 4/2009 | Hsu | |
| 2009/0207469 A1 | 8/2009 | Bausenwein | |
| 2010/0110166 A1 | 5/2010 | Chang | |
| 2010/0110383 A1* | 5/2010 | Tang | G02B 5/3058 |
| | | | 353/8 |
| 2010/0195006 A1 | 8/2010 | Iwai | |
| 2010/0277796 A1 | 11/2010 | Magarill | |
| 2011/0007392 A1 | 1/2011 | English, Jr. | |
| 2011/0019153 A1 | 1/2011 | Lee | |
| 2011/0205496 A1 | 8/2011 | Schuck | |
| 2011/0216396 A1* | 9/2011 | Ouderkirk | G02B 27/141 |
| | | | 359/352 |
| 2011/0242653 A1* | 10/2011 | Ouderkirk | G02B 27/102 |
| | | | 359/487.04 |
| 2011/0249238 A1 | 10/2011 | Liao | |
| 2012/0256879 A1* | 10/2012 | Liu | G02B 27/26 |
| | | | 345/175 |
| 2014/0022510 A1 | 1/2014 | Bausenwein | |
| 2014/0253849 A1* | 9/2014 | Poon | G02B 27/102 |
| | | | 349/97 |

FOREIGN PATENT DOCUMENTS

| | | |
|---|---|---|
| EP | 477889 | 4/1992 |
| EP | 1337117 | 8/2003 |
| EP | 1647963 | 4/2006 |
| JP | 2003-140087 | 5/2003 |
| KR | 2005-0012513 | 2/2005 |
| KR | 2011-0020435 | 3/2011 |
| TW | 200519517 | 6/2005 |
| TW | 200914876 | 4/2009 |
| WO | WO 1998-07279 | 2/1998 |
| WO | WO 2000-063738 | 10/2000 |
| WO | WO 2000-070386 | 11/2000 |
| WO | WO 2005-076635 | 8/2005 |
| WO | WO 2008-042798 | 4/2008 |
| WO | WO 2008-141247 | 11/2008 |
| WO | WO 2009-085856 | 7/2009 |
| WO | WO 2009-086310 | 7/2009 |
| WO | WO 2009-139798 | 11/2009 |
| WO | WO 2009-139799 | 11/2009 |
| WO | WO 2010-057272 | 5/2010 |
| WO | WO 2010-059412 | 5/2010 |
| WO | WO 2010-059453 | 5/2010 |
| WO | WO 2010-059681 | 5/2010 |
| WO | WO 2010-059684 | 5/2010 |
| WO | WO 2010-070917 | 6/2010 |
| WO | WO 2010-094445 | 8/2010 |
| WO | WO 2010-147652 | 12/2010 |
| WO | WO 2011-034810 | 3/2011 |
| WO | WO 2011-068337 | 6/2011 |
| WO | WO 2012-039895 | 3/2012 |
| WO | WO 2012-039993 | 3/2012 |
| WO | WO 2012-039995 | 3/2012 |
| WO | WO 2012-154431 | 11/2012 |
| WO | WO 2013-081822 | 6/2013 |
| WO | WO 2013-082020 | 6/2013 |
| WO | WO 2013-162895 | 10/2013 |

* cited by examiner

TWO IMAGER PROJECTION DEVICE

CROSS REFERENCE TO RELATED APPLICATIONS

This application is a national stage filing under 35 U.S.C. 371 of PCT/US2013/036679, filed Apr. 16, 2013, which claims priority to U.S. Provisional Application No. 61/637,933, filed Apr. 25, 2012, the disclosure of which is incorporated by reference in its/their entirety herein.

BACKGROUND 3D video is becoming popular in consumer electronics. This is largely due to the increasing popularity of 3D cinema. However none of the existing implementations of 3D video are completely satisfactory. One popular approach, using time sequencing of the left and right images, employs active shutter glasses to extract the stereo image out of the time domain. One problem with this approach is that each eye sees light only half of the time, leading to a diminished perceived brightness. Another problem is that the active shuttering can lead to the perception of flicker in the image which can result in eye fatigue or other physical symptoms. In order to eliminate flicker, the imagers must be operated at high frequencies in order to blur out the modulation. This increases the technical requirements and cost of the imagers. In addition, the active shutter glasses can be quite expensive and are generally not suitable for large audiences.

A second approach, popularized by Real-D Cinema Systems, is to use polarized light to present two different images to the eyes, one polarization for the left eye and a second polarization for the right eye. In the Real-D approach, the light is circularly polarized in order to minimize the impact of rotations of the face around the viewing axis. One advantage of the Real-D process is that it uses passive glasses, and the lenses of the glasses need only be circularly polarized in an opposite sense to one another. Typically in the Real-D process, either two separate projectors are used and the outputs separately circularly polarized, or a single projector is used and in a time sequential manner the output is polarized with alternate circular polarizations. One disadvantage of the Real-D system is that half of the light is lost: in the first case two projectors are required, but one polarization from each is discarded, and in the second case half of the light is lost when one polarization is discarded in a time sequential fashion.

A third approach, by Dolby Laboratories and others, uses two sets of additive primary colors, one for each eye to create the stereo image. A set of passive glasses, each lens of which transmits only the appropriate set of additive primaries is provided to separate out the stereo images for the viewer. One disadvantage of this approach is that the optical efficiency can be rather low, or the complexity of the projector is rather high.

SUMMARY

The present disclosure describes optical elements and optical devices that use the optical elements to allow the output of two imagers to be combined onto a single optical axis. Each of the two imagers can be based on alternate polarization directions, and the disclosed embodiments can enable high contrast 3D projectors without requiring either time or polarization sequencing. The present disclosure further describes projection systems that include the optical devices. In one aspect, the present disclosure provides an imaging device that includes a first reflective polarizer disposed to intercept an unpolarized input light and reflect a first polarization direction of the unpolarized input light toward a first imager and transmit a second polarization direction of the light; a second imager disposed facing the first imager such that the first reflective polarizer is between the first and the second imager; and a second reflective polarizer disposed to intercept the unpolarized input light and reflect the second polarization direction of the unpolarized input light toward the second imager and transmit the first polarization direction of the light. The first polarization direction of the unpolarized input light reflects from the first imager and exits the imaging device as a first imaged second polarization direction light, and the second polarization direction of the unpolarized input light reflects from the second imager and exits the imaging device as a second imaged first polarization direction light. In yet another aspect, the present disclosure provides a projection system that includes the imaging device; an unpolarized input light source capable of injecting light into the imaging device; and projection optics disposed to project light exiting from the imaging device to a projection screen.

In another aspect, the present disclosure provides an imaging device that includes a first reflective polarizer disposed to reflect a first polarization direction of an unpolarized input light toward a first imager; a second imager disposed facing the first imager such that the first reflective polarizer is between the first and the second imager; and a second reflective polarizer disposed to reflect a second polarization direction of the unpolarized input light toward the second imager. A first portion of the first polarization direction of the unpolarized input light reflects from the first reflective polarizer and passes through the second reflective polarizer before intercepting the first imager, a first remaining portion of the first polarization direction of the unpolarized input light passes through the second reflective polarizer and reflects from the first reflective polarizer before intercepting the first imager. Further, a second portion of the second polarization direction of the unpolarized input light reflects from the second reflective polarizer and passes through the first reflective polarizer before intercepting the second imager, a second remaining portion of the second polarization direction of the unpolarized input light passes through the first reflective polarizer and reflects from the second reflective polarizer before intercepting the second imager, and the first polarization direction of the unpolarized input light reflects from the first imager and exits the imaging device as a first imaged second polarization direction light, and the second polarization direction of the unpolarized input light reflects from the second imager and exits the imaging device as a second imaged first polarization direction light. In yet another aspect, the present disclosure provides a projection system that includes the imaging device; an unpolarized input light source capable of injecting light into the imaging device; and projection optics disposed to project light exiting from the imaging device to a projection screen.

In yet another aspect, the present disclosure provides an imaging device that includes a first imager capable of imparting a first image to a first polarization direction of light and rotating the first polarization direction of light to a second polarization direction of light upon reflection from the first imager; a second imager facing the first imager, the second imager capable of imparting a second image to the second polarization direction of light and rotating the second polarization direction of light to the first polarization direction of light upon reflection from the second imager; and a first reflective polarizer and a second reflective polarizer disposed between the first imager and the second imager, the first and second reflective polarizers aligned to orthogonal polarization directions such that the first polarization direction of an unpolarized input light is reflected toward the first imager, and the second polarization direction of the unpolarized input light is reflected toward the second imager. The first polarization direction of the unpolarized input light reflects from the first imager and exits the imaging device as a first imaged second polarization direction light, and the second polarization direction of the unpolarized input light reflects from the second imager and exits the imaging device as a second imaged first polarization direction light. In yet another aspect, the present disclosure provides a projection system that includes the imaging device; an unpolarized input light source capable of injecting light into the imaging device; and projection optics disposed to project light exiting from the imaging device to a projection screen.

In yet another aspect, the present disclosure provides an imaging device that includes a first reflective polarizer laminate disposed to intercept an unpolarized input light and reflect a first polarization direction of the unpolarized input light toward a first imager and transmit a converted first polarization direction light; a second reflective polarizer laminate disposed to intercept the unpolarized input light and reflect a second polarization direction of the unpolarized input light toward a second imager and transmit a converted second polarization direction light; a third reflective polarizer laminate disposed to intercept the converted first polarization direction light and reflect it toward the second imager; and a fourth reflective polarizer laminate disposed to intercept the converted second polarization direction light and reflect it toward the first imager. The first through fourth reflective polarizer laminates are disposed between the second imager and the first imager, the first polarization direction of the unpolarized input light reflects from the second imager and exits the imaging device as a second imaged first polarization direction light, and the second polarization direction of the unpolarized input light reflects from the first imager and exits the imaging device as a first imaged second polarization direction light. In yet another aspect, the present disclosure provides a projection system that includes the imaging device; an unpolarized input light source capable of injecting light into the imaging device; and projection optics disposed to project light exiting from the imaging device to a projection screen.

In yet another aspect, the present disclosure provides an imaging device that includes a first plane comprising a first reflective polarizer aligned to a first polarization direction; and a second plane perpendicular to the first plane and intersecting the first plane along an axis, the second plane comprising a second reflective polarizer aligned to a second orthogonal polarization direction. The imaging device further includes a first imager disposed at a 45 degree angle to each of the first and second planes and parallel to the axis, the first imager capable of reflecting a first imaged output light from incident light; a second imager parallel to the first imager and opposite the axis, the second imager capable of reflecting a second imaged output light from incident light; an input plane perpendicular to the first and second imager and parallel to the axis; and an output plane parallel to the input plane and opposite the axis. An unpolarized input light passing through the input plane and intersecting the first and second reflective polarizers passes through the output plane as the first imaged output light having the first polarization direction and the second imaged output light having the second orthogonal polarization direction. In yet another aspect, the present disclosure provides a projection system that includes the imaging device; an unpolarized input light source capable of injecting light into the imaging device; and projection optics disposed to project light exiting from the imaging device to a projection screen.

In yet another aspect, the present disclosure provides an optical element that includes a first plane comprising a first reflective polarizer; a second plane perpendicular to the first plane and intersecting the first plane along an axis, the second plane comprising a second reflective polarizer; an input surface disposed at a 45 degree angle to each of the first and second planes and parallel to the axis; a first side surface disposed perpendicular to the input surface and parallel to the axis; a second side surface disposed parallel to the first side surface and opposite the axis; and an output surface disposed parallel to the input surface and opposite the axis. In yet another aspect, the present disclosure provides an optical device that includes the optical element; a first polarization rotating reflector disposed adjacent the first side surface; and a second polarization rotating reflector disposed adjacent the second side surface, wherein the unpolarized input light that is split into first polarized light passing through the first side surface and second orthogonal polarized light passing through the second side surface is reflected back into the optical element by the first and the second polarization rotating reflectors, respectively, and exits from the output surface. In yet another aspect, the present disclosure provides a projection system that includes the optical device; an unpolarized input light source capable of injecting light into the input surface; and projection optics disposed to project light exiting from the output surface to a projection screen.

In yet another aspect, the present disclosure provides an imaging device that includes a first imager and a second imager, wherein the second imager faces the first imager and wherein the projection of a first imaging area of the first imager, when projected toward the second imager in a direction normal to a major surface of the first imager, intersects at least about 75% of a second imaging area of the second imager.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

It would be extremely useful to have a device that enables high contrast 3-D projection without requiring time sequencing or multiple projectors. The present disclosure describes optical elements and optical devices that use the optical elements to split the input light into two orthogonal polarizations that exit the element on the same optical axis but moving in opposite directions. The optical elements and optical devices that use the optical elements also allow the output of two imagers to be combined onto a single optical axis. Each of the two imagers can be based on alternate polarization directions, and the disclosed embodiments can enable high contrast 3D projectors without requiring either time or polarization sequencing. The present disclosure further describes projection systems that include the optical devices. In some cases, however, time and/or polarization sequencing can be layered upon the described optical device to provide enhancements that were not possible with prior approaches, as described elsewhere. The disclosed embodiments effectively double the brightness of the optical device compared to conventional approaches. The construction can further eliminate issues with low contrast that are associated with prior approaches.

X-Cubes are known in the art to be used in projection devices such as Liquid Crystal Display (LCD) projectors. Generally, the X-Cube separates and re-combines different wavelengths of light based on crossed dichroic mirrors; however, in particular embodiments described herein, a new device in the shape of an X-cube, an X-polarizing beam splitter (X-PBS), is described which separates unpolarized input light into two distinct polarization directions using crossed reflective polarizers. The two distinct polarizations exit the X-PBS on the same optical axis but propagate in opposite directions. The two distinct polarizations may then be individually routed to one of two imagers, light reflected from the imagers may then be recombined by the X-PBS which then presents the resulting light to a projection lens.

In one particular embodiment, the present disclosure can enable low-cost, high contrast 3D projection without time sequencing (and the attendant cost and disadvantage of active shutter glasses) and without the high equipment cost of other polarization based technologies. The disclosure can use reflective polarizers such as 3M Multilayer Optical Film (MOF) polarizers, which have sufficiently high reflection and transmission properties to enable an efficient device.

In another particular embodiment, identical content can be displayed onto both of the two imagers, which can serve to effectively double the brightness of the projector and permit the use of both polarizations without the use of a polarization converting system. This can enable the use of larger LEDs and further increase the brightness achievable in the projector.

In yet another particular embodiment, two different video contents (one on each polarization state) can be imaged and projected onto a single screen. In this embodiment, two separate pairs of polarized glasses can be used by different viewers, each pair transmitting only a single polarization state to separate out the different content. This embodiment can enable two different viewers to view two different video contents at the same time on the same screen.

In yet another particular embodiment, two different video contents, each having one of two orthogonal polarization states, can be projected onto a reflective polarizer, thereby separating the two contents so that they can be displayed separately, for example, side-by-side or one on top of the other.

In yet another particular embodiment, time sequencing and active goggles (that is, shutter glasses) can be combined with the disclosed device, so that two different 3D contents can be projected simultaneously by the same device on to the same (or, in combination with the above embodiment, different) screens.

Some embodiments of polarization-based 3D projectors use a single polarizing beam splitter (PBS), feeding illumination light via one face, splitting the light into two polarizations off of the PBS, transmitting the light to two different imagers located on two additional side surfaces, and then recombining the light on the PBS and allowing the light to exit the PBS through the fourth face where it enters the projection lens. However, this embodiment suffers from significantly impaired contrast due to reflection of dark-state p-polarization into the projection lens. This generally can limit the contrast of single PBS 3D systems to about 25:1, which may be unacceptable for some applications. In addition, depending on the reflective polarizer technology used, there can be significant differences between the efficiency of the transmitted polarization compared to the reflected polarization. This can be especially the case if the required polarization directions do not correspond to the defined s- and p-polarization directions associated with the reflective polarizer.

In contrast to typical polarization based 3D projectors, the embodiments described herein each use multiple equivalents of a polarizing beam splitter (PBS). It should be understood that any conventional reflective polarizer technology may be used in the embodiments described herein. However, reflective polarizers based on multilayer optical film (MOF) are particularly advantageous because of their high efficiency and ability to operate at low F/#.

In some cases, the reflective polarizer can be a Cartesian reflective polarizer or a non-Cartesian reflective polarizer. A non-Cartesian reflective polarizer can include multilayer inorganic films such as those produced by sequential deposition of inorganic dielectrics, such as a MacNeille polarizer. A Cartesian reflective polarizer has a polarization axis state, and includes both wire-grid polarizers and polymeric multilayer optical films (MOF) such as can be produced by extrusion and subsequent stretching of a multilayer polymeric laminate. A Cartesian reflective polarizer film provides the polarizing beam splitter with an ability to pass unpolarized input light rays that are not fully collimated, and that are divergent or skewed from a central light beam axis, with high efficiency. The Cartesian reflective polarizer film can comprise a polymeric multilayer optical film that comprises multiple layers of dielectric or polymeric material. Use of dielectric films can have the advantage of low attenuation of light and high efficiency in passing light. The multilayer optical film can comprise polymeric multilayer optical films such as those described in U.S. Pat. No. 5,962,114 (Jonza et al.) or U.S. Pat. No. 6,721,096 (Bruzzone et al.).

In some embodiments, a retarder, such as a half-wave retarder, can placed adjacent a reflective polarizer to effect different polarization states being reflected or transmitted from the polarizer/retarder assembly. In some cases, a retarder, such as a quarter-wave retarder, can be positioned adjacent to an imager, to effect rotation of the polarization direction of incident light upon reflection from the imager. According to one aspect, the retarder is a quarter-wave retarder aligned at approximately 45 degrees to a polarization direction of the reflective polarizer. In one embodiment, the alignment can be from 35 to 55 degrees; from 40 to 50 degrees; from 43 to 48 degrees; or from 44.5 to 45.5 degrees to a polarization direction of the reflective polarizer. In one particular embodiment, when the incident light intercepts the quarter-wave retarder and the reflective polarizer at approximately 45 degrees, it can be preferable to have the quarter-wave retarder aligned instead at approximately 53 degrees to the polarization direction of the reflective polarizer.

In some embodiments, each of the reflective polarizers described herein can instead be a reflective polarizer laminate that includes a second reflective polarizer disposed adjacent to a first reflective polarizer, with both reflective polarizers aligned to pass the same polarization direction of light. In some embodiments, each of the reflective polarizer laminates can further include an absorbing polarizer disposed between the two reflective polarizers, also aligned to the same polarization direction. The use of multiple reflective polarizers disposed adjacent each other, either with or without an absorptive polarizer sandwiched therebetween, can dramatically improve the contrast of the projection devices described herein.

For the purposes of the description provided herein, the term "aligned to a desired polarization state" or "aligned to a desired polarization direction" is intended to associate the alignment of the pass axis of an optical element to a desired polarization state of light that passes through the optical element, that is, a desired polarization state such as s-polarization, p-polarization, right-circular polarization, left-circular polarization, or the like. In one embodiment described herein with reference to the Figures, an optical element such as a polarizer aligned to the first polarization state means the orientation of the polarizer that passes the p-polarization state of light, and reflects or absorbs the second polarization state (in this case the s-polarization state) of light. It is to be understood that the polarizer can instead be aligned to pass the s-polarization state of light, and reflect or absorb the p-polarization state of light, if desired.

Also for the purposes of the description provided herein, the term "facing" refers to one element disposed so that a perpendicular line from the surface of the element follows an optical path that is also perpendicular to the other element. One element facing another element can include the elements disposed adjacent each other. One element facing another element further includes the elements separated by optics so that a light ray perpendicular to one element is also perpendicular to the other element.

In some cases, a polarization component of an unpolarized input light can pass through to a polarization rotating reflector. The polarization rotating reflector reverses the propagation direction of the light and alters the magnitude of the polarization components, depending of the type and orientation of a retarder disposed in the polarization rotating reflector. The polarization rotating reflector can be used to simply reflect light, such as with a mirror, and can also be used to impart information, such as an image, to the unpolarized input light which can results in an imaged light output. As such, the polarization rotating reflector can include a liquid crystal imager, a liquid crystal on silicon (LCoS) imager, a digital micromirror imager, a broadband mirror, a wavelength-selective mirror such as a dichroic filter, and a retarder. The retarder can provide any desired retardation, such as an eighth-wave retarder, a quarter-wave retarder, and the like, although quarter-wave retarders can be advantageously used. Linearly polarized light is changed to circularly polarized light as it passes through a quarter-wave retarder aligned at an angle of 45° to the axis of light polarization. In contrast, linearly polarized light is changed to a polarization state partway between s-polarization and p-polarization (either elliptical or linear) as it passes through other retarders and orientations, and can result in a lower efficiency of light transport within an optical device. In some cases, however, different retardation (for example, half-wave retardation) may be combined with different orientations (for example, 22.5 degrees or the like) may be envisioned that can result in a similar efficiency, if desired.

Several different light sources can be used to illuminate the projector, including one or more light emitting diodes (LED's), lasers, laser diodes, organic LED's (OLED's), and non solid state light sources such as ultra high pressure (UHP) mercury, halogen or xenon lamps with appropriate collectors or reflectors. Liquid Crystal on Silicon (LCoS)-based portable projection systems are becoming common due to the availability of low cost and high resolution LCoS panels. In one particular example, a list of elements in an LED-illuminated LCoS projector may include LED light source or sources, optional color combiner, relay optics, X-PBS, LCoS panels, and projection lens unit.

In some cases, a micromirror array such as a DLP® imager available from Texas Instruments can be used as the imager to form an image for the projector. In the DLP® imager, individual mirrors within the digital micro-mirror array represent individual pixels of the projected image. In some cases, particularly when using polarized light to illuminate the micromirror array, it may be desirable to rotate the polarization direction of the incident and reflected light by using a retarder, such as a quarter-wave retarder, such that light having a first polarization direction directed toward the imager is rotated to an orthogonal second polarization direction upon reflection from the imager, as described elsewhere. The quarter-wave retarder can be aligned at an angle, such as about 45 degrees, to a desired polarization direction, as described elsewhere.

Figure 1A:
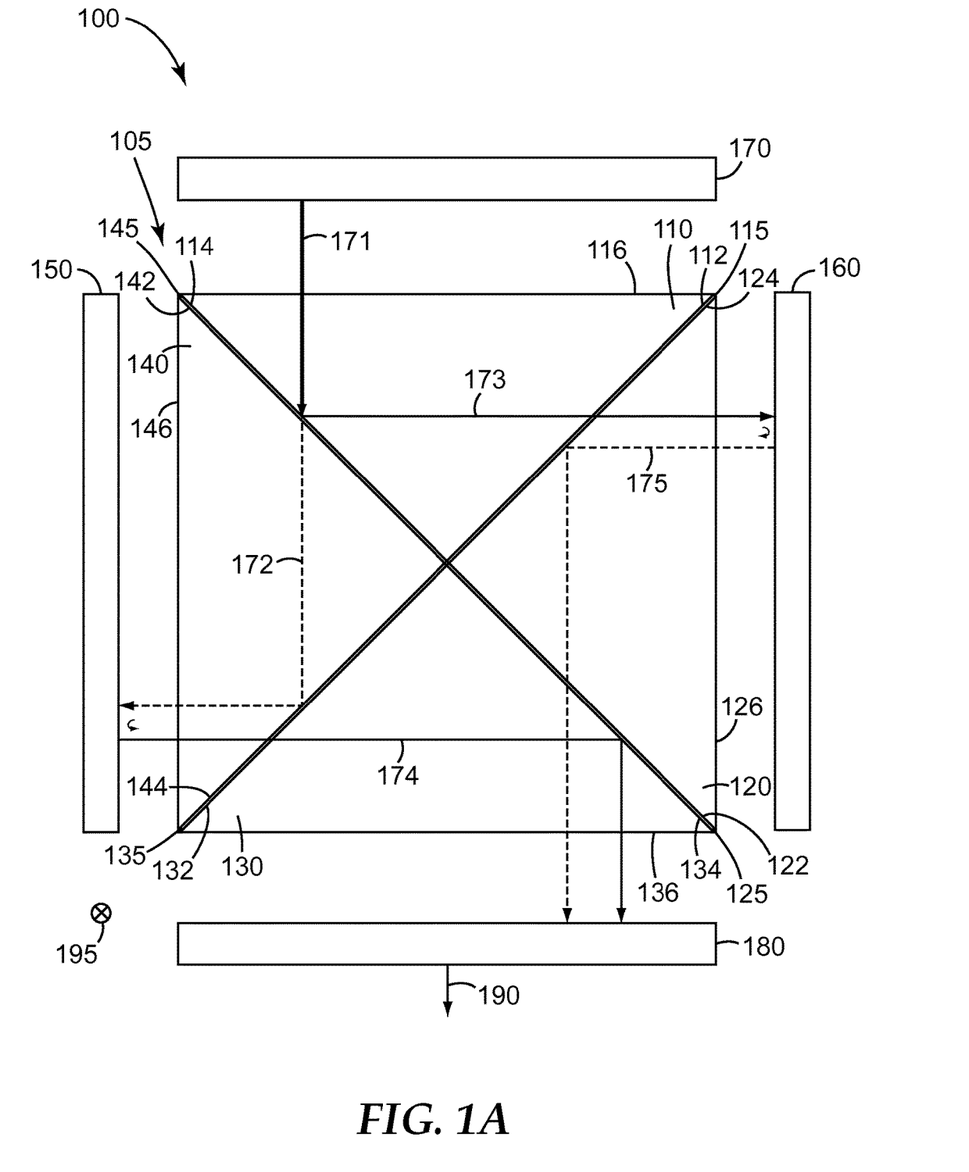
FIGS. 1A-1B show a cross-sectional schematic of a two imager projector.
Figure 1B:
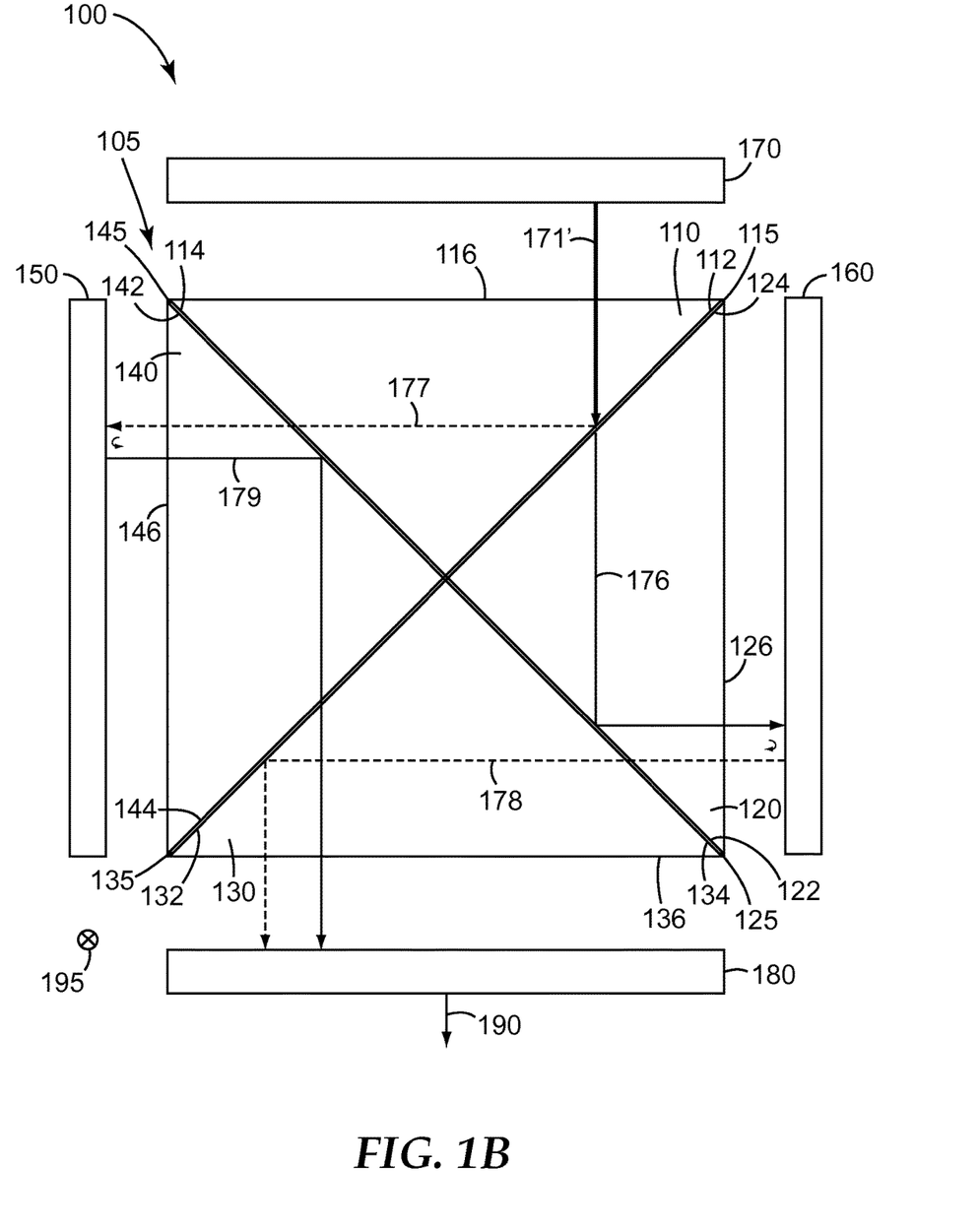

FIGS. 1A-1B show a cross-sectional schematic of an imaging device 100, and the paths of light beams through the imaging device 100 using an X-PBS 105, according to one aspect of the disclosure. Generally, illumination optics 170 are used to direct light into the X-PBS 105 where the light is separated into two orthogonal polarization components, one directed towards a first imager 150 and the other directed towards a second imager 160. Each of the first and second imagers 150, 160, imparts an image to the incident light and rotates the polarization direction of the reflected light. Because of this change in polarization direction, the reflected light re-enters and then exits the X-PBS 105 and enters projection optics 180. Projection optics 180 for projecting an image to a projection screen have been described elsewhere, and are generally well known to those of skill in the art. In some embodiments, the first imager 150 can be said to be parallel to the second imager 160, and opposite the X-PBS 105.

Illumination optics 170 generally provide a collimated (that is, a well defined cone angle) and uniform light that can be efficiently used within the X-PBS 105 and collected by the projection optics 180. Illumination optics 170 can include any of the light sources described elsewhere, and can be associated with a variety of optical elements including collimators and color combiners that are suitable for use in the present disclosure including those described, for example, in U.S. Patent Application Ser. Nos. 61/385,237, 61/385,241, 61/385,248, 61/485,165; PCT Patent Publication Nos. WO2009/085856 entitled "Light Combiner", WO2009/086310 entitled "Light Combiner", WO2009/139798 entitled "Optical Element and Color Combiner", WO2009/139799 entitled "Optical Element and Color Combiner"; and also in co-pending PCT Patent Application Nos. US2009/062939 entitled "Polarization Converting Color Combiner", US2009/063779 entitled "High Durability Color Combiner", US2009/064927 entitled "Color Combiner", and US2009/064931 entitled "Polarization Converting Color Combiner"; published U.S. Patent Application Nos. US2010/0277796, US2011/0007392, US2011/0216396; published PCT Patent Application No. WO2011/034810; and also in U.S. Pat. No. 7,821,713.

The illumination light and the light reflecting from the imager are reflected from the surface of a reflective polarizer. For this reason, effectively two separate reflective polarizers are required, the two having principal axes of polarization orthogonal to one another. FIG. 1A and FIG. 1B shows two different paths of light through the X-PBS 105, each of the different paths are due to the light being intercepted initially by different reflective polarizers, as described below.

Turning now to FIG. 1A, an imaging device 100 includes an X-PBS 105 having an input surface 116, an output surface 136, a second side surface 126 and a first side surface 146. The X-PBS 105 can be described as including a first prism 110 having a first interior surface 112, a second interior surface 114 and the input surface 116; a second prism 120 including a third interior surface 122, a fourth interior surface 124, and the second side surface 126; a third prism 130 having a fifth interior surface 132, a sixth interior surface 134, and the output surface 136; and a fourth prism 140 having a seventh interior surface 142, and eighth interior surface 144, and the first side surface 146.

A first reflective polarizer 145 is disposed between the second and seventh interior surfaces 114,142, and a third reflective polarizer 125 is disposed between the third and sixth interior surfaces 122,134. Each of the first and third reflective polarizers 145, 125 are aligned to a first polarization direction 195, and can be contiguous; first and third reflective polarizers 145, 125 are referred to collectively herein as the contiguous first reflective polarizer. A second reflective polarizer 115 is disposed between the first and fourth interior surfaces 112,124, and a fourth reflective polarizer 135 is disposed between the fifth and eighth interior surfaces 132,144. Each of the second and fourth reflective polarizers 115, 135 are aligned at a second polarization direction orthogonal to a first polarization direction 195, and can be contiguous; second and fourth reflective polarizers 115, 135 are referred to collectively herein as the contiguous second reflective polarizer. In one particular embodiment shown in FIGS. 1A-1B, contiguous first reflective polarizer is aligned to reflect p-polarized light and transmit s-polarized light, and contiguous second reflective polarizer is aligned to transmit p-polarized light and reflect s-polarized light, although it is to be understood that the transmit/reflect polarization alignments can be reversed if desired. It is further to be understood that the transmit/reflect polarization alignments may be other than those defined by p-polarized or s-polarized light.

Illumination optics 170 is disposed to inject an unpolarized light beam 171 into the input surface, a first imager 150 is disposed adjacent the first side surface 146, a second imager 160 is disposed adjacent the second side surface 126, and projection optics 180 are disposed adjacent the output surface 136. An unpolarized input light beam 171 is directed from illumination optics 170, enters X-PBS 105 through input surface 116, intercepts first reflective polarizer 145 and is split into transmitted s-polarized first light 172 and reflected p-polarized second light 173. Transmitted s-polarized first light 172 reflects from fourth reflective polarizer 135, exits X-PBS 105 through first side surface 146, reflects from first imager 150 as imaged p-polarized first light 174, and re-enters X-PBS 105 through first side surface 146. Imaged p-polarized first light 174 passes through fourth reflective polarizer 135, reflects from third reflective polarizer 125, exits X-PBS 105 through output surface 136 and enters projection optics 180 as imaged p-polarized first light 174.

Reflected p-polarized second light 173 passes through second reflective polarizer 115, exits X-PBS 105 through second side surface 126, reflects from second imager 160 as imaged s-polarized second light 175, and re-enters X-PBS through second side surface 126. Imaged s-polarized second light 175 reflects from second reflective polarizer 115, passes through third reflective polarizer 125, exits X-PBS 105 through output surface 136 and enters projection optics 180 as imaged s-polarized second light 175.

Turning now to FIG. 1B, the path of an unpolarized light beam 171' entering the X-PBS 105 as described with reference to FIG. 1A, and intercepting the second reflective polarizer 115 is described. Each of the elements 100-195 shown in FIG. 1B correspond to like-numbered elements shown in FIG. 1A, which have been described previously. For example, X-PBS 105 in FIG. 1B corresponds to X-PBS 105 in FIG. 1A, and so on.

An unpolarized input light beam 171' is directed from illumination optics 170, enters X-PBS 105 through input surface 116, intercepts second reflective polarizer 115 and is split into transmitted p-polarized third light 176 and reflected s-polarized fourth light 177. Transmitted p-polarized third light 176 reflects from third reflective polarizer 125, exits X-PBS 105 through second side surface 126, reflects from second imager 160 as imaged s-polarized third light 178, and re-enters X-PBS 105 through second side surface 126. Imaged s-polarized third light 178 passes through third reflective polarizer 125, reflects from fourth reflective polarizer 135, exits X-PBS 105 through output surface 136 and enters projection optics 180 as imaged s-polarized third light 178.

Reflected s-polarized fourth light 177 passes through first reflective polarizer 145, exits X-PBS 105 through first side surface 146, reflects from first imager 150 as imaged p-polarized fourth light 179, and re-enters X-PBS 105 through first side surface 146. Imaged p-polarized fourth light 179 reflects from first reflective polarizer 145, passes through fourth reflective polarizer 135, exits X-PBS 105 through output surface 136 and enters projection optics 180 as imaged p-polarized fourth light 179.

Imaged p-polarized first light 174 (FIG. 1A) and imaged p-polarized fourth light 179 (FIG. 1B) collectively can be described as a first imaged first polarization direction light that includes information from the first imager 150 as p-polarized light. Imaged s-polarized second light 175 (FIG. 1A) and imaged s-polarized third light 178 (FIG. 1B) can be described as a second imaged second polarization direction light that includes information from the second imager 160 as s-polarized light. The first and second imaged first polarization direction lights exit projection optics as portions of projected light 190 which can be: a 3D stereoscopic projection without time-sequencing, using different polarization states for images sent to each eye; an effectively doubled brightness image for identical images on each of the two imagers; two completely different video contents viewable on the same screen using different polarization state glasses; two different video contents, one on each polarization state, projected onto a reflective polarizer, thereby separating the two contents so that they can be displayed, for example, side-by-side or one on top of the other; or time sequenced images combined with active goggles, so that two different 3D contents are projected simultaneously by the same device on to the same (or, in combination with the above embodiment, different) screens, as described elsewhere.

Figure 2A:
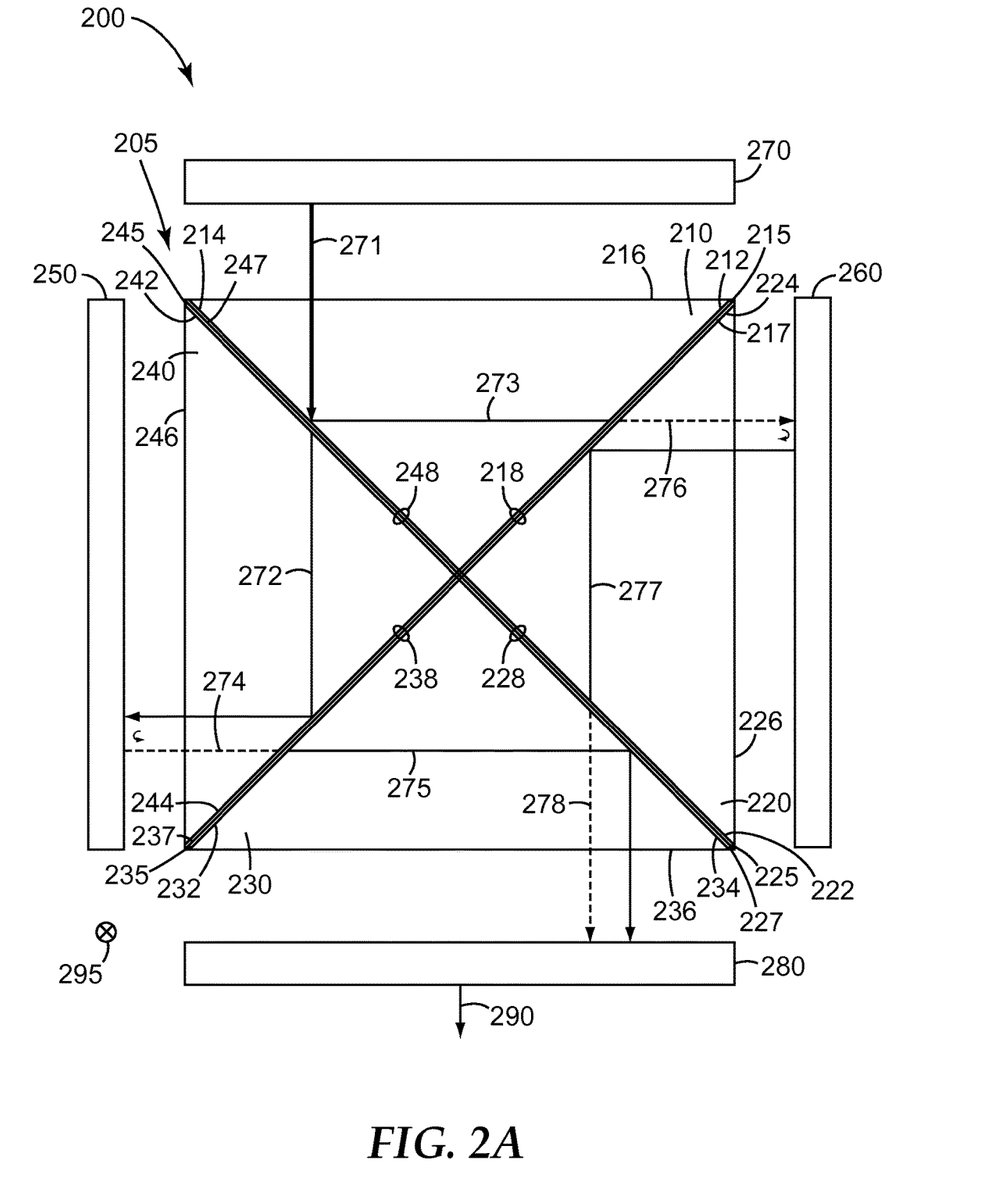
FIGS. 2A-2B show a cross-sectional schematic of a two imager projector.
Figure 2B:
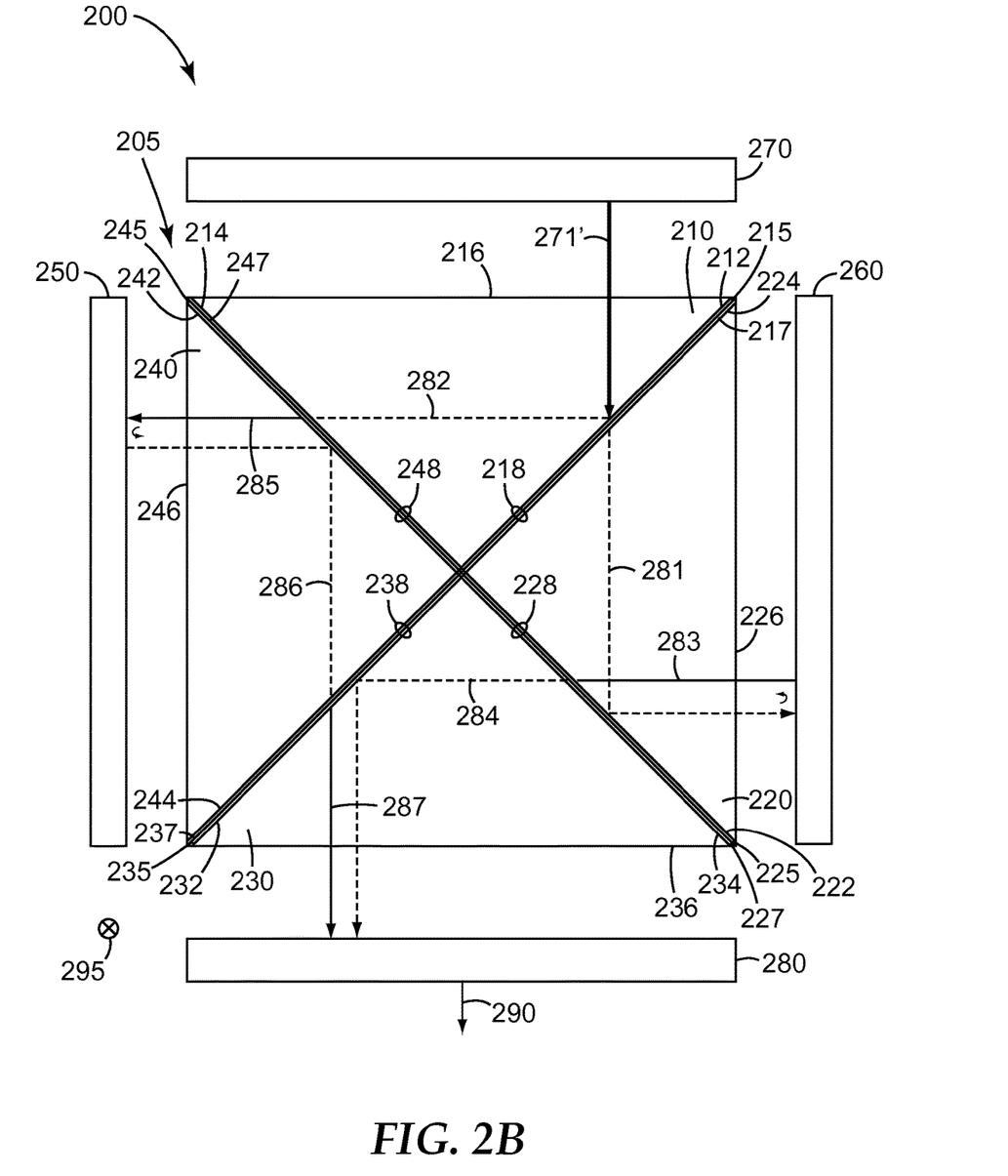

FIGS. 2A-2B show a cross-sectional schematic of an imaging device 200, and the paths of light beams through the imaging device 200 using an X-PBS 205, according to one aspect of the disclosure. Generally, illumination optics 270 are used to direct light into the X-PBS 205 where the light is separated into two orthogonal polarization components, one directed towards a first imager 250 and the other directed towards a second imager 260. Each of the first and second imagers 250, 260, imparts an image to the incident light and rotates the polarization direction of the reflected light. Because of this change in polarization direction, the reflected light re-enters and then exits the X-PBS 205 and enters projection optics 280.

The illumination light and the light reflecting from the imager are reflected from the surface of a reflective polarizer. For this reason, two separate reflective polarizer laminates are required, each reflective polarizer laminate including a reflective polarizer aligned to a first polarization direction and a half-wave retarder disposed immediately adjacent the reflective polarizer, the resulting laminates providing a rotation of reflected and transmitted beams as described elsewhere. In one particular embodiment, any of the half-wave retarders shown and described in FIGS. 2A and 2B can instead be substituted with two quarter-wave retarders having slightly different alignments relative to the first polarization direction. Because the angle of incidence into the half wave plate is not normal, two quarter wave plates may provide improved efficiency since there can be greater flexibility in their orientation. FIG. 2A and FIG. 2B shows two different paths of light through the X-PBS 205, each of the different paths are due to the light being intercepted initially by different reflective polarizer laminates.

Turning now to FIG. 2A, an imaging device 200 includes an X-PBS 205 having an input surface 216, an output surface 236, a second side surface 226 and a first side surface 246. The X-PBS 205 can be described as including a first prism 210 having a first interior surface 212, a second interior surface 214 and the input surface 216; a second prism 220 including a third interior surface 222, a fourth interior surface 224, and the second side surface 226; a third prism 230 having a fifth interior surface 232, a sixth interior surface 234, and the output surface 236; and a fourth prism 240 having a seventh interior surface 242, and eighth interior surface 244, and the first side surface 246.

A first reflective polarizer laminate 248 comprising a first reflective polarizer 245 and a first half-wave retarder 247 is disposed between the second and seventh interior surfaces 214,242; and a third reflective polarizer laminate 228 comprising a third reflective polarizer 225 and a third half-wave retarder 227 is disposed between the third and sixth interior surfaces 222,234. A second reflective polarizer laminate 218 comprising a second reflective polarizer 215 and a second half-wave retarder 217 is disposed between the first and fourth interior surfaces 212,224; and a fourth reflective polarizer laminate 238 comprising a fourth reflective polarizer 235 and a fourth half-wave retarder 237 is disposed between the fifth and eighth interior surfaces 232,244.

Each of the first, second, third and fourth reflective polarizers 245, 215, 225, 235 in each of the first, second third and fourth reflective polarizer laminates 248, 218, 228, 238, are aligned to a first polarization direction 295. The first, second, third, and fourth half-wave retarders 247, 217, 227, 237, disposed immediately adjacent to each reflective polarizer affects the polarization direction of each of the transmitted and reflected beams from each laminate, in much the same manner as the crossed reflective polarizers described in FIG. 1A-1B. In one particular embodiment shown in FIGS. 2A-2B, the first polarization direction 295 (and likewise first, second, third, and fourth reflective polarizers 245, 215, 225, 235) is aligned to transmit p-polarized light and reflect s-polarized light, although it is to be understood the transmit/reflect polarization alignments can be reversed if desired or aligned to a different polarization altogether.

Each of the reflective polarizer laminates have relative orientations of the reflective polarizer and the half-wave plate such that the desired polarization direction light is directed to an imager, and that polarization direction is then directed through the output surface to the projector optics. The first reflective polarizer laminate 248, for example, includes the first half-wave retarder 247 adjacent the second interior surface 214 of the first prism 210, and the first reflective polarizer 245 adjacent the seventh interior surface 242 of the fourth prism 240. In this manner, p-polarized light passing from the first prism 210 toward the fourth prism 240 changes to s-polarized light upon passing through the first half-wave retarder 247, reflects from the first reflective polarizer 245, and changes back to p-polarized light again as it passes through the first half-wave retarder 247. In a similar manner, s-polarized light passing from the first prism 210 toward the fourth prism 240 changes to p-polarized light upon passing through the first half-wave retarder 247, and passes through the first reflective polarizer 245.

The interactions of each polarization direction of light passing through each of the reflective polarizer laminates in each of the directions (whether intercepting the respective reflective polarizer first or the half-wave retarder first) can readily be determined by one of ordinary skill in the art, as described above. The second reflective polarizer laminate 218 includes the second half-wave retarder 217 adjacent the fourth interior surface 224 of the second prism 220, and the second reflective polarizer 215 adjacent the first interior surface 212 of the first prism 210. The third reflective polarizer laminate 228 includes the third half-wave retarder 227 adjacent the sixth interior surface 234 of the third prism 230, and the third reflective polarizer 225 adjacent the third interior surface 222 of the third prism 230. The fourth reflective polarizer laminate 238 includes the fourth half-wave retarder 237 adjacent the eighth interior surface 244 of the fourth prism 240, and the fourth reflective polarizer 235 adjacent the fifth interior surface 232 of the third prism 230.

An illumination optics 270 is disposed to inject an unpolarized light beam 271 into the input surface, a first imager 250 is disposed adjacent the first side surface 246, a second imager 260 is disposed adjacent the second side surface 226, and projection optics 280 are disposed adjacent the output surface 236. An unpolarized input light beam 271 is directed from illumination optics 270, enters X-PBS 205 through input surface 216, intercepts first reflective polarizer laminate 248 and is split into transmitted p-polarized first light 272 and reflected p-polarized second light 273. Transmitted p-polarized first light 272 reflects from fourth reflective polarizer laminate 238, exits X-PBS 205 through first side surface 246, reflects from first imager 250 as imaged s-polarized first light 274, and re-enters X-PBS 205 through first side surface 246. Imaged s-polarized first light 274 passes through fourth reflective polarizer laminate 238 becoming imaged p-polarized first light 275, reflects from third reflective polarizer laminate 228, exits X-PBS 205 through output surface 236 and enters projection optics 280 as imaged p-polarized first light 275.

Reflected p-polarized second light 273 passes through second reflective polarizer laminate 218 becoming reflected s-polarized second light 276, exits X-PBS 205 through second side surface 226, reflects from second imager 260 as imaged p-polarized second light 277, and re-enters X-PBS through second side surface 226. Imaged p-polarized second light 277 reflects from second reflective polarizer laminate 218, passes through third reflective polarizer laminate 228 becoming imaged s-polarized second light 278, exits X-PBS 205 through output surface 236 and enters projection optics 280 as imaged s-polarized second light 278.

Turning now to FIG. 2B, the path of an unpolarized light beam 271' entering the X-PBS 205 as described with reference to FIG. 2A, and intercepting the second reflective polarizer laminate 218 is described. Each of the elements 200-295 shown in FIG. 2B correspond to like-numbered elements shown in FIG. 2A, which have been described previously. For example, X-PBS 205 in FIG. 2B corresponds to X-PBS 205 in FIG. 2A, and so on.

An unpolarized input light beam 271' is directed from illumination optics 270, enters X-PBS 205 through input surface 216, intercepts second reflective polarizer laminate 218 and is split into transmitted s-polarized third light 281 and reflected s-polarized fourth light 282. Transmitted s-polarized third light 281 reflects from third reflective polarizer laminate 228, exits X-PBS 205 through second side surface 226, reflects from second imager 260 as imaged p-polarized third light 283, and re-enters X-PBS 205 through second side surface 226. Imaged p-polarized third light 283 passes through third reflective polarizer laminate 228 becoming imaged s-polarized third light 284, reflects from fourth reflective polarizer laminate 238, exits X-PBS 205 through output surface 236, and enters projection optics 280 as imaged s-polarized third light 284.

Reflected s-polarized fourth light 282 passes through first reflective polarizer laminate 248 becoming reflected p-polarized fourth light 285, exits X-PBS 205 through first side surface 246, reflects from first imager 250 as imaged s-polarized fourth light 286, and re-enters X-PBS 205 through first side surface 246. Imaged s-polarized fourth light 286 reflects from first reflective polarizer laminate 248, passes through fourth reflective polarizer laminate 238 becoming imaged p-polarized fourth light 287, exits X-PBS 205 through output surface 236 and enters projection optics 280 as imaged p-polarized fourth light 287.

Imaged p-polarized first light 275 (FIG. 2A) and imaged p-polarized fourth light 287 (FIG. 2B) collectively can be described as a first imaged first polarization direction light that includes information from the first imager 250 as p-polarized light. Imaged s-polarized second light 278 (FIG. 2A) and imaged s-polarized third light 284 (FIG. 2B) can be described as a second imaged second polarization direction light that includes information from the second imager 260 as s-polarized light. The first and second imaged lights exit projection optics as portions of projected light 290 which can be a 3D stereoscopic projection without time-sequencing, using different polarization states for images sent to each eye; an effectively doubled brightness image for identical images on each of the two imagers; two completely different video contents viewable on the same screen using different polarization state glasses; two different video contents, one on each polarization state, projected onto a reflective polarizer, thereby separating the two contents so that they can be displayed, for example, side-by-side or one on top of the other; or time sequenced images combined with active goggles, so that two different 3D contents are projected simultaneously by the same device on to the same (or, in combination with the above embodiment, different) screens, as described elsewhere.

Because the imaged light reflected from an imager is subsequently reflected from the reflective polarizers, the reflective polarizers must be sufficiently flat to maintain appropriate resolution of the image. Techniques for providing sufficiently flat reflective polarizers can be found, for example, in U.S. Patent Application Ser. No. 61/564,172 entitled METHOD OF MAKING POLARIZING BEAM SPLITTERS PROVIDING HIGH RESOLUTION IMAGES AND SYSTEMS UTILIZING SUCH BEAM SPLITTERS filed Nov. 28, 2011. Flatness can be quantified by the standard roughness parameters Ra (the average of the absolute value of the vertical deviation of the surface from the mean), Rq (the root mean squared average of the vertical deviation of the surface from the mean), and Rz (the average distance between the highest peak and lowest valley in each sampling length). Specifically, the reflective polarizer preferably has a surface roughness Ra of less than 45 nm or a surface roughness Rq of less than 80 nm, and more preferably has a surface roughness Ra of less than 40 nm or a surface roughness Rq of less than 70 nm, and even more preferably has a surface roughness Ra of less than 35 nm or a surface roughness Rq of less than 55 nm.

In the projection light paths, the respective transmitting polarizers serve as "cleanup" polarizers for the image reflecting polarizers. This provides the potential for improved contrast compared to single PBS reflective imaging approaches.

Following are a list of embodiments of the present disclosure.

Item 1 is an imaging device, comprising: a first reflective polarizer disposed to intercept an unpolarized input light and reflect a first polarization direction of the unpolarized input light toward a first imager and transmit a second polarization direction of the light; a second imager disposed facing the first imager such that the first reflective polarizer is between the first and the second imager; and a second reflective polarizer disposed to intercept the unpolarized input light and reflect a second polarization direction of the unpolarized input light toward the second imager and transmit the first polarization direction of the light, wherein the first polarization direction of the unpolarized input light reflects from the first imager and exits the imaging device as a first imaged second polarization direction light, and the second polarization direction of the unpolarized input light reflects from the second imager and exits the imaging device as a second imaged first polarization direction light.

Item 2 is the imaging device of item 1, wherein a first portion of the first polarization direction of the unpolarized input light reflects from the first reflective polarizer and passes through the second reflective polarizer before intercepting the first imager, and a remaining portion of the first polarization direction of the unpolarized input light passes through the second reflective polarizer and reflects from the first reflective polarizer before intercepting the first imager.

Item 3 is the imaging device of item 1 or item 2, wherein a first portion of the second polarization direction of the unpolarized input light reflects from the second reflective polarizer and passes through the first reflective polarizer before intercepting the second imager, and a remaining portion of the second polarization direction of the unpolarized input light passes through the first reflective polarizer and reflects from the second reflective polarizer before intercepting the second imager.

Item 4 is the imaging device of item 1 to item 3, wherein the first and second polarization direction comprise orthogonal polarization directions.

Item 5 is the imaging device of item 4, wherein the orthogonal polarization directions comprise linear polarization.

Item 6 is the imaging device of item 1 to item 5, wherein each of the reflective polarizers are disposed as pellicles or as interior surfaces of an X-cube.

Item 7 is the imaging device of item 1 to item 6, wherein images produced by the first imager and the second imager each comprise a portion of a stereoscopic image.

Item 8 is the imaging device of item 1 to item 7, wherein the first imager and the second imager comprise a liquid crystal imager, a liquid crystal on silicon (LCOS) imager, a digital micromirror imager, or a combination thereof.

Item 9 is the imaging device of claim 8, wherein the digital micromirror imager further comprises a quarter-wave retarder.

Item 10 is the imaging device of item 1 to item 9, wherein the unpolarized input light comprises a time-sequenced color input.

Item 11 is the imaging device of item 1 to item 10, wherein the first and second imagers in combination comprise an alternating time-sequenced first stereoscopic image and second stereoscopic image.

Item 12 is an imaging device, comprising: a first reflective polarizer disposed to reflect a first polarization direction of an unpolarized input light toward a first imager; a second imager disposed facing the first imager such that the first reflective polarizer is between the first and the second imager; and a second reflective polarizer disposed to reflect a second polarization direction of the unpolarized input light toward the second imager, wherein a first portion of the first polarization direction of the unpolarized input light reflects from the first reflective polarizer and passes through the second reflective polarizer before intercepting the first imager, a first remaining portion of the first polarization direction of the unpolarized input light passes through the second reflective polarizer and reflects from the first reflective polarizer before intercepting the first imager; and further wherein a second portion of the second polarization direction of the unpolarized input light reflects from the second reflective polarizer and passes through the first reflective polarizer before intercepting the second imager, a second remaining portion of the second polarization direction of the unpolarized input light passes through the first reflective polarizer and reflects from the second reflective polarizer before intercepting the second imager, wherein the first polarization direction of the unpolarized input light reflects from the first imager and exits the imaging device as a first imaged second polarization direction light, and the second polarization direction of the unpolarized input light reflects from the second imager and exits the imaging device as a second imaged first polarization direction light.

Item 13 is the imaging device of item 12, wherein the first and second polarization directions comprise orthogonal polarization directions.

Item 14 is the imaging device of item 13, wherein the orthogonal polarization directions comprise linear polarization.

Item 15 is the imaging device of item 12 to item 14, wherein each of the reflective polarizers are disposed as pellicles or as interior surfaces of an X-cube.

Item 16 is the imaging device of item 12 to item 15, wherein images produced by the first imager and the second imager each comprise a portion of a stereoscopic image.

Item 17 is the imaging device of item 12 to item 16, wherein the first imager and the second imager comprise a liquid crystal imager, a liquid crystal on silicon (LCOS) imager, a digital micromirror imager, or a combination thereof.

Item 18 is the imaging device of item 17, wherein the digital micromirror imager further comprises a quarter-wave retarder.

Item 19 is the imaging device of item 12 to item 18, wherein the unpolarized input light comprises a time-sequenced color input.

Item 20 is the imaging device of item 12 to item 19, wherein the first and second imagers in combination comprise an alternating time-sequenced first stereoscopic image and second stereoscopic image.

Item 21 is an imaging device, comprising: a first imager capable of imparting a first image to a first polarization direction of light and rotating the first polarization direction of light to a second polarization direction of light upon reflection from the first imager; a second imager facing the first imager, the second imager capable of imparting a second image to a second polarization direction of light and rotating the second polarization direction of light to the first polarization direction of light upon reflection from the second imager; and a first reflective polarizer and a second reflective polarizer disposed between the first imager and the second imager, the first and second reflective polarizers aligned to orthogonal polarization directions such that the first polarization direction of an unpolarized input light is reflected toward the first imager, and the second polarization direction of the unpolarized input light is reflected toward the second imager, wherein the first polarization direction of the unpolarized input light reflects from the first imager and exits the imaging device as a first imaged second polarization direction light, and the second polarization direction of the unpolarized input light reflects from the second imager and exits the imaging device as a second imaged first polarization direction light.

Item 22 is the imaging device of item 21, wherein the orthogonal polarization directions comprise linear polarization.

Item 23 is the imaging device of item 21 or item 22, wherein each of the reflective polarizers are disposed as pellicles or as interior surfaces of an X-cube.

Item 24 is the imaging device of item 21 to item 23, wherein images produced by the first imager and the second imager each comprise a portion of a stereoscopic image.

Item 25 is the imaging device of item 21 to item 24, wherein the first imager and the second imager comprise a liquid crystal imager, a liquid crystal on silicon (LCOS) imager, a digital micromirror imager, or a combination thereof.

Item 26 is the imaging device of item 25, wherein the digital micromirror imager further comprises a quarter-wave retarder.

Item 27 is the imaging device of item 21 to item 26, wherein the unpolarized input light comprises a time-sequenced color input.

Item 28 is the imaging device of item 21 to item 27, wherein the first and second imagers in combination comprise an alternating time-sequenced first stereoscopic image and second stereoscopic image.

Item 29 is an imaging device, comprising: a first reflective polarizer laminate disposed to intercept an unpolarized input light and reflect a first polarization direction of the unpolarized input light toward a first imager and transmit a converted first polarization direction light; a second reflective polarizer laminate disposed to intercept the unpolarized input light and reflect a second polarization direction of the unpolarized input light toward a second imager and transmit a converted second polarization direction light; a third reflective polarizer laminate disposed to intercept the converted first polarization direction light and reflect it toward the second imager; a fourth reflective polarizer laminate disposed to intercept the converted second polarization direction light and reflect it toward the first imager; wherein the first through fourth reflective polarizer laminates are disposed between the second imager and the first imager, the first polarization direction of the unpolarized input light reflects from the second imager and exits the imaging device as a second imaged first polarization direction light, and the second polarization direction of the unpolarized input light reflects from the first imager and exits the imaging device as a first imaged second polarization direction light.

Item 30 is the imaging device of item 29, wherein each of the first through the fourth reflective polarizer laminates comprise a reflective polarizer and a half-wave retarder.

Item 31 is the imaging device of item 30, wherein the reflective polarizer is aligned to a first polarization direction and the half-wave retarder is aligned at an angle to the first polarization direction.

Item 32 is the imaging device of item 29 to item 31, wherein the first through fourth reflective polarizer laminates each comprise a reflective polarizer aligned to a first polarization direction and a half-wave retarder aligned at an angle to the first polarization direction, the first and second reflective polarizer laminates oriented such that the half-wave retarder is closer to the second imager, and the third and fourth reflective polarizer laminates oriented such that the half-wave retarder is closer to the first imager.

Item 33 is the imaging device of item 29 to item 32, wherein the first and second polarization directions comprise orthogonal polarization directions.

Item 34 is the imaging device of item 33, wherein the orthogonal polarization directions comprise linear polarization.

Item 35 is the imaging device of item 29 to item 34, wherein each of the first through fourth reflective polarizer laminates are disposed as pellicles or as interior surfaces of an X-cube.

Item 36 is the imaging device of item 29 to item 35, wherein the first imager and the second imager each comprise a portion of a stereoscopic image.

Item 37 is the imaging device of item 29 to item 36, wherein the first imager and the second imager comprise a liquid crystal imager, a liquid crystal on silicon (LCOS) imager, a digital micromirror imager, or a combination thereof.

Item 38 is the imaging device of item 37, wherein the digital micromirror imager further comprises a quarter-wave retarder.

Item 39 is the imaging device of item 29 to item 38, wherein the unpolarized input light comprises a time-sequenced color input.

Item 40 is the imaging device of item 29 to item 39, wherein the first and second imagers in combination comprise an alternating time-sequenced first stereoscopic image and second stereoscopic image.

Item 41 is an imaging device, comprising: a first plane comprising a first reflective polarizer aligned to a first polarization direction; a second plane perpendicular to the first plane and intersecting the first plane along an axis, the second plane comprising a second reflective polarizer aligned to a second orthogonal polarization direction; a first imager disposed at a 45 degree angle to each of the first and second planes and parallel to the axis, the first imager capable of reflecting a first imaged output light from incident light; a second imager parallel to the first imager and opposite the axis, the second imager capable of reflecting a second imaged output light from incident light; an input plane perpendicular to the first and second imager and parallel to the axis; and an output plane parallel to the input plane and opposite the axis, wherein an unpolarized input light passing through the input plane and intersecting the first and second reflective polarizers passes through the output plane as a first imaged output light having the first polarization direction and a second imaged output light having the second polarization direction.

Item 42 is the imaging device of item 41, wherein the first polarization direction and the orthogonal second polarization directions each comprise linear polarization.

Item 43 is the imaging device of item 41 or item 42, wherein each of the reflective polarizers are disposed as pellicles or as interior surfaces of an X-cube.

Item 44 is the imaging device of item 41 to item 43, wherein images produced by the first imager and the second imager each comprise a portion of a stereoscopic image.

Item 45 is the imaging device of item 41 to item 44, wherein the first imager and the second imager comprise a liquid crystal imager, a liquid crystal on silicon (LCOS) imager, a digital micromirror imager, or a combination thereof.

Item 46 is the imaging device of item 45, wherein the digital micromirror imager further comprises a quarter-wave retarder.

Item 47 is the imaging device of item 41 to item 46, wherein the unpolarized input light comprises a time-sequenced color input.

Item 48 is the imaging device of item 41 to item 47, wherein the first and second imagers in combination comprise an alternating time-sequenced first stereoscopic image and second stereoscopic image.

Item 49 is a projection system, comprising: the imaging device according to item 1 to item 48; an unpolarized input light source capable of injecting light into the imaging device; and projection optics disposed to project light exiting from the imaging device to a projection screen.

Item 50 is an optical element, comprising: a first plane comprising a first reflective polarizer; a second plane perpendicular to the first plane and intersecting the first plane along an axis, the second plane comprising a second reflective polarizer; an input surface disposed at a 45 degree angle to each of the first and second planes and parallel to the axis; a first side surface disposed perpendicular to the input surface and parallel to the axis; a second side surface disposed parallel to the first side surface and opposite the axis; and an output surface disposed parallel to the input surface and opposite the axis.

Item 51 is the optical element of item 50, wherein the first reflective polarizer is aligned to a first polarization direction, the second reflective polarizer is aligned to a second orthogonal polarization direction, and an unpolarized input light passing through the input surface and intersecting the first and second reflective polarizers, is split into a first polarized light having the first polarization direction passing through the first side surface and a second polarized light having the second orthogonal polarization direction passing through the second side surface.

Item 52 is the optical element of item 50, wherein the first reflective polarizer and the second reflective polarizer are aligned to a first polarization direction, each of the first and second reflective polarizers further comprise a half-wave retarder disposed immediately adjacent the respective polarizer, and an unpolarized input light passing through the input surface and intersecting the first and second reflective polarizers and the associated half-wave retarders, is split into a first polarized light having the first polarization direction passing through the first side surface and a second polarized light having a second orthogonal polarization direction passing through the second side surface.

Item 53 is an optical device, comprising: the optical element of item 51 or item 52; a first polarization rotating reflector disposed adjacent the first side surface; and a second polarization rotating reflector disposed adjacent the second side surface, wherein the unpolarized input light that is split into first polarized light passing through the first side surface and second orthogonal polarized light passing through the second side surface is reflected back into the optical element by the first and the second polarization rotating reflectors, respectively, and exits from the output surface.

Item 54 is the optical device of item 53, wherein the first and the second polarization rotating reflector are selected from an imager, a reflector, a retarder, or a combination thereof.

Item 55 is the optical device of item 54, wherein the imager is selected from a DLP imager and an LCOS imager.

Item 56 is the optical element of item 51 or item 52, wherein for the first polarized light having the first polarization direction passing through the first side surface and a second polarized light having a second orthogonal polarization direction passing through the second side surface reflected back into the respective first or second side surface with unchanged polarization direction exits the optical element through the input surface, whereas for the first polarized light having the first polarization direction passing through the first side surface and a second polarized light having a second orthogonal polarization direction passing through the second side surface reflected back into the respective first or second side surface with 90° rotated polarization direction, exits the optical element through the output surface.

Item 57 is a projection system, comprising: the optical device of item 53 to item 56; an unpolarized input light source capable of injecting light into the input surface; and projection optics disposed to project light exiting from the output surface to a projection screen.

Item 58 is an imaging device, comprising: a first imager and a second imager, wherein the second imager faces the first imager and wherein the projection of a first imaging area of the first imager, when projected toward the second imager in a direction normal to a major surface of the first imager, intersects at least about 75% of a second imaging area of the second imager.

Item 59 is the imaging device of item 1 to item 49, wherein each reflective polarizer comprises a reflective polarizer laminate having either a pair of reflective polarizers, or an absorptive polarizer sandwiched between a pair of reflective polarizers, each aligned to the same polarization direction.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An imaging device, comprising:
a first reflective polarizer laminate disposed to intercept an unpolarized input light and reflect a first polarization direction of the unpolarized input light toward a first imager and transmit a second polarization direction of the light, wherein the first reflective polarizer laminate comprises a polymeric multilayer first reflective polarizer aligned to the first polarization direction adjacent a first half-wave retarder and a third reflective polarizer aligned to the first polarization direction adjacent a third half-wave retarder;
a second imager disposed facing the first imager such that the first reflective polarizer laminate is between the first and the second imager; and
a second reflective polarizer laminate disposed to intercept the unpolarized input light and reflect the second polarization direction of the unpolarized input light toward the second imager and transmit the first polarization direction of the light, wherein the second reflective polarizer laminate comprises a polymeric multilayer second reflective polarizer aligned to the first polarization direction adjacent a second half-wave retarder and a fourth reflective polarizer aligned to the first polarization direction adjacent a fourth half-wave retarder;
wherein the first polarization direction of the unpolarized input light reflects from the first imager, is reflected from the second and fourth reflective polarizers, and exits the imaging device as a first imaged second polarization direction light, and the second polarization direction of the unpolarized input light reflects from the second imager, is reflected by the first and third reflective polarizers, and exits the imaging device as a second imaged first polarization direction light.

2. The imaging device of claim 1, wherein a first portion of the first polarization direction of the unpolarized input light reflects from the first reflective polarizer laminate and passes through the second reflective polarizer laminate before intercepting the first imager, and a remaining portion of the first polarization direction of the unpolarized input light passes through the second reflective polarizer laminate and reflects from the first reflective polarizer laminate before intercepting the first imager.

3. The imaging device of claim 1, wherein a first portion of the second polarization direction of the unpolarized input light reflects from the second reflective polarizer laminate and passes through the first reflective polarizer laminate before intercepting the second imager, and a remaining portion of the second polarization direction of the unpolarized input light passes through the first reflective polarizer laminate and reflects from the second reflective polarizer laminate before intercepting the second imager.

4. The imaging device of claim 1, wherein the first and second polarization direction comprise orthogonal polarization directions.

5. The imaging device of claim 4, wherein the orthogonal polarization directions comprises linear polarization.

6. The imaging device of claim 1, wherein each of the reflective polarizer laminates are disposed as pellicles or as interior surfaces of an X-cube.

7. The imaging device of claim 1, wherein images produced by the first imager and the second imager each comprise a portion of a stereoscopic image.

8. The imaging device of claim 1, wherein the first imager and the second imager comprise a liquid crystal imager, a liquid crystal on silicon (LCOS) imager, a digital micromirror imager, or a combination thereof.

9. The imaging device of claim 8, wherein the digital micromirror imager further comprises a quarter-wave retarder.

10. The imaging device of claim 1, wherein the unpolarized input light comprises a time-sequenced color input.

11. The imaging device of claim 1, wherein the first and second imagers in combination comprise an alternating time-sequenced first stereoscopic image and second stereoscopic image.

* * * * *